United States Patent [19]
Pratt et al.

[11] Patent Number: 6,127,058
[45] Date of Patent: Oct. 3, 2000

[54] PLANAR FUEL CELL

[75] Inventors: Steven D. Pratt, Plantation; Ronald J. Kelley, Coral Springs; Sivakumar Muthuswamy, Plantation; Bobby Dean Landreth, Fort Lauderdale; Robert W. Pennisi, Ocean Ridge, all of Fla.

[73] Assignee: Motorola, Inc., Schaumburg, Ill.

[21] Appl. No.: 09/183,459

[22] Filed: Oct. 30, 1998

[51] Int. Cl.[7] .............................. H01M 8/10; H01M 8/02; H01M 8/24
[52] U.S. Cl. ................................ 429/30; 429/18; 429/35; 429/38; 429/39
[58] Field of Search ................................ 429/12, 18, 34, 429/35, 36, 38, 39, 30, 32

[56] References Cited

U.S. PATENT DOCUMENTS

| | | |
|---|---|---|
| 3,554,803 | 1/1971 | Poirier . |
| 4,769,296 | 9/1988 | Sterzel ...................................... 429/12 |
| 5,069,985 | 12/1991 | Cohen et al. ............................. 429/26 |
| 5,190,834 | 3/1993 | Kendall ..................................... 429/31 |
| 5,686,197 | 11/1997 | Nishida et al. ............................ 429/30 |
| 5,783,324 | 7/1998 | Binder et al. ............................. 429/31 |
| 5,989,741 | 11/1999 | Bloomfield et al. ...................... 429/32 |

FOREIGN PATENT DOCUMENTS 2286482  8/1995  United Kingdom .

OTHER PUBLICATIONS

Adlhart, O.J., Rohonyi P., Modroukas D., and Driller, J., "A small Portable Proton Exchange Membrane Fuel Cell and Hydrogen Generator for Medical Applications," ASAIO Journal 1997 (No Month).

*Primary Examiner*—Carol Chaney
*Assistant Examiner*—Jonathan Crepeau
*Attorney, Agent, or Firm*—Dale W. Dorinski

[57] ABSTRACT

A planar fuel cell (20) is provided, including a membrane electrode assembly (23) sandwiched between two current collector assemblies (21, 22). The membrane electrode assembly is a single sheet of a polymer electrolyte membrane with an array of anodes (27) on one side and an array of corresponding cathodes (28) on the other side. The current collectors (25) can be supported by a plastic frame (24), and they have an interconnect tab (26) that provides an electrical pathway to the exterior of the membrane electrode assembly. The interconnect tab is situated to provide electron transfer between the anodes and the cathodes such that the interconnect tab does not traverse the thickness of the polymer electrolyte membrane. When the planar fuel cell is assembled, the interconnect tab is sealed to prevent leaking of fuel or oxidant gases. Fuel is distributed (36) to only one side of the membrane electrode assembly and oxidant is distributed (36) only to the other side.

23 Claims, 5 Drawing Sheets

PLANAR FUEL CELL

TECHNICAL FIELD

This invention relates in general to fuel cells, and in particular, to fuel cells having a solid electrolyte and integral gas sealing features.

BACKGROUND

Fuel cells are electrochemical cells in which a free energy change resulting from a fuel oxidation reaction is converted into electrical energy. As shown in FIG. 1, a typical fuel cell 10 consists of a fuel electrode (anode) 12 and an oxidant electrode (cathode) 14, separated by an ion-conducting electrolyte 16. The electrodes are connected electrically to a load (such as an electronic circuit) 18 by an external circuit conductor. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. In theory, any substance capable of chemical oxidation that can be supplied continuously (as a gas or fluid) can be oxidized galvanically as the fuel at the anode 12 of a fuel cell. Similarly, the oxidant can be any material that can be reduced at a sufficient rate. Gaseous hydrogen has become the fuel of choice for most applications, because of its high reactivity in the presence of suitable catalysts and because of its high energy density. Similarly, at the fuel cell cathode 14 the most common oxidant is gaseous oxygen, which is readily and economically available from the air for fuel cells used in terrestrial applications. When gaseous hydrogen and oxygen are used as fuel and oxidant, the electrodes are porous to permit the gas-electrolyte junction to be as great as possible. The electrodes must be electronic conductors, and possess the appropriate reactivity to give significant reaction rates. At the anode 12, incoming hydrogen gas ionizes to produce hydrogen ions and electrons. Since the electrolyte is a non-electronic conductor, the electrons flow away from the anode via the metallic external circuit 18. At the cathode 14, oxygen gas reacts with the hydrogen ions migrating through the electrolyte 16 and the incoming electrons from the external circuit to produce water as a byproduct. The byproduct water is typically extracted as vapor. The overall reaction that takes place in the fuel cell is the sum of the anode and cathode reactions, with part of the free energy of reaction released directly as electrical energy. The difference between this available free energy and the heat of reaction is produced as heat at the temperature of the fuel cell. It can be seen that as long as hydrogen and oxygen are fed to the fuel cell, the flow of electric current will be sustained by electronic flow in the external circuit and ionic flow in the electrolyte.

In practice, a number of these unit fuel cells are normally stacked or 'ganged' together to form a fuel cell assembly. A number of individual cells are electrically connected in series by abutting the anode current collector of one cell with the cathode current collector of its nearest neighbor in the stack. Fuel and oxidant are introduced through manifolds into respective chambers. The dilemma with stacking and porting these traditional types of fuel cells lies in the extremely complex flat stack arrangements and numerous parts (membranes, gaskets, channels, electrodes and bipolar plates) that are difficult and expensive to fabricate and assemble, and are highly subject to catastrophic failure of the entire system if a leak develops. As can be easily appreciated, the cost of fabricating and assembling fuel cells is significant, due to the materials and labor involved. In addition, it is difficult to transport the oxygen and hydrogen through the stack, and increased gas transport requires pressurization, with attendant difficulties.

An alternate style of fuel cell has been recently proposed (U.S. Pat. No. 5,783,324) which is a side-by-side configuration in which a number of individual cells are placed next to each other in a planar arrangement. This is an elegant solution to the problem of gas transport and mechanical hardware. However, in order to connect the individual cells together, an electric connection must pass through the plane of the cell to the adjacent cell (see, for example, U.S. Pat. Nos. 5,190,834 and 5,783,324). These solutions have a major flaw, in that the electrical connection that traverses the electrolyte needs to be sealed and is prone to failure over the life of the cell. Thus, although planar fuel cells continue to hold technological promise, they remain a dream that has so far proven to be elusive to the skilled artisan. An improved planar fuel cell that is less complex and less prone to failure would be a significant addition to the field.

DETAILED DESCRIPTION OF THE PREFERRED EMBODIMENT

Figure 1:
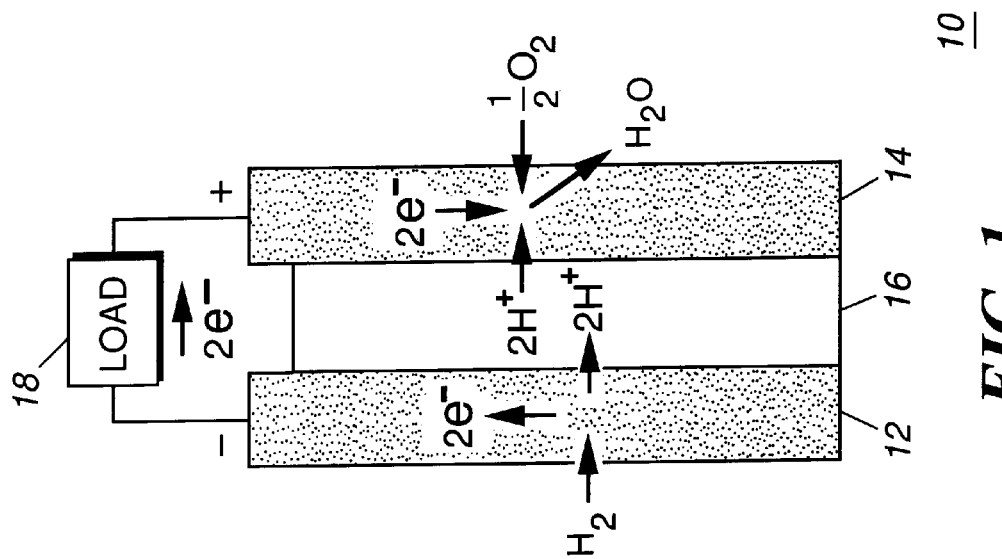
FIG. 1 is schematic representation of a typical fuel cell as practiced in the prior art.

A planar fuel cell is created by sandwiching a membrane electrode assembly between two current collector assemblies. The membrane electrode assembly (MEA) is a single sheet of a polymer electrolyte membrane with an array of anodes on one side and an array of corresponding cathodes on the other side. The current collectors may be supported by a plastic frame, and they have an interconnect tab that provides an electrical pathway beyond the perimeter of the MEA. The interconnect tab is situated to provide electron transfer between the anodes and the cathodes such that the interconnect tab does not traverse the thickness of the polymer electrolyte membrane. When the planar fuel cell is assembled, the interconnect tab is sealed to prevent leaking of fuel or oxidant gases. Fuel is distributed to only one side of the membrane electrode assembly and oxidant is distributed only to the other side.

In our preferred embodiment, the solid electrolyte is a polymer electrolyte membrane (PEM). Some typical materials for the PEM are perfluorinated sulfonic acids derived from fluorinated styrenes, perfluorinated sulfonic acid derived from fluorinated ethylenes, and polybenzimidazole. PEMs are ionic polymers having very high ion conductivity. The polymeric nature of PEMs makes them much easier to handle than liquid electrolytes, and the physical construction of the electrochemical cell is greatly simplified since elaborate seals and containment systems are not needed to contain corrosive liquid electrolytes. PEMs have the following properties: (1) high ionic conductivity, (2) zero electronic conductivity, (3) very low permeability to gases, (4) chemical stability at operating temperature, (5) mechanical strength, (6) low sensitivity to humidity, and (7) compatibility with catalyst. Fuel cells employing PEMs are described and known in the literature (see, for example, U.S. Pat. No. 5,403,675), and since one of ordinary skill in the art is assumed to be familiar with PEM cells, they will not be further elaborated upon here. In PEM-based fuel cells, the proton exchange membrane is coated on both sides with a catalyst (platinum or palladium) to form an electrode. This assembly is called a membrane electrode assembly (MEA). As used in the context of this discussion and elsewhere in the literature, either side of the MEA can serve as the anode or cathode. In the strictest sense, it is hydrogen that is the anode material (fuel) and oxygen is the cathode material (oxidizer). However, practically speaking, whichever electrode of the MEA is exposed to hydrogen is accordingly referred to as the anode. Conversely, the oxygen side electrode is called the cathode. Electrodes of the MEA have several functions. They must: 1) diffuse oxygen and hydrogen evenly across the surface, 2) allow water molecules to escape (principally a cathode-side issue), 3) hold back a small amount water to keep the membrane wet and efficient (cathode side issue only), 4) catalyze the reactions, 5) conduct electrons so they can be collected and routed through an electrical circuit, and 6) conduct protons a very short distance to the proton exchange membrane. To accomplish these disparate needs, MEAs typically consist of several layers of various forms of carbon and polymers in addition to the catalyst. Both the water management and the electron conduction functions are satisfied with dual role diffusion layers which are sandwiched over the catalyst layers. These diffusion layers are usually comprised of woven carbon fiber cloth or porous carbon paper. In practice, the diffusion layer can be integral to the electrodes, integral to the current collectors, or a separate piece sandwiched between the current collector and the electrode. In our preferred embodiment, the diffusion layer is incorporated in the electrodes, but it can also be part of the current collector or a separate piece. For simplicity, we assume that the diffusion layer does not restrict the relative proximity of the current collector and the electrode.

Figure 2:
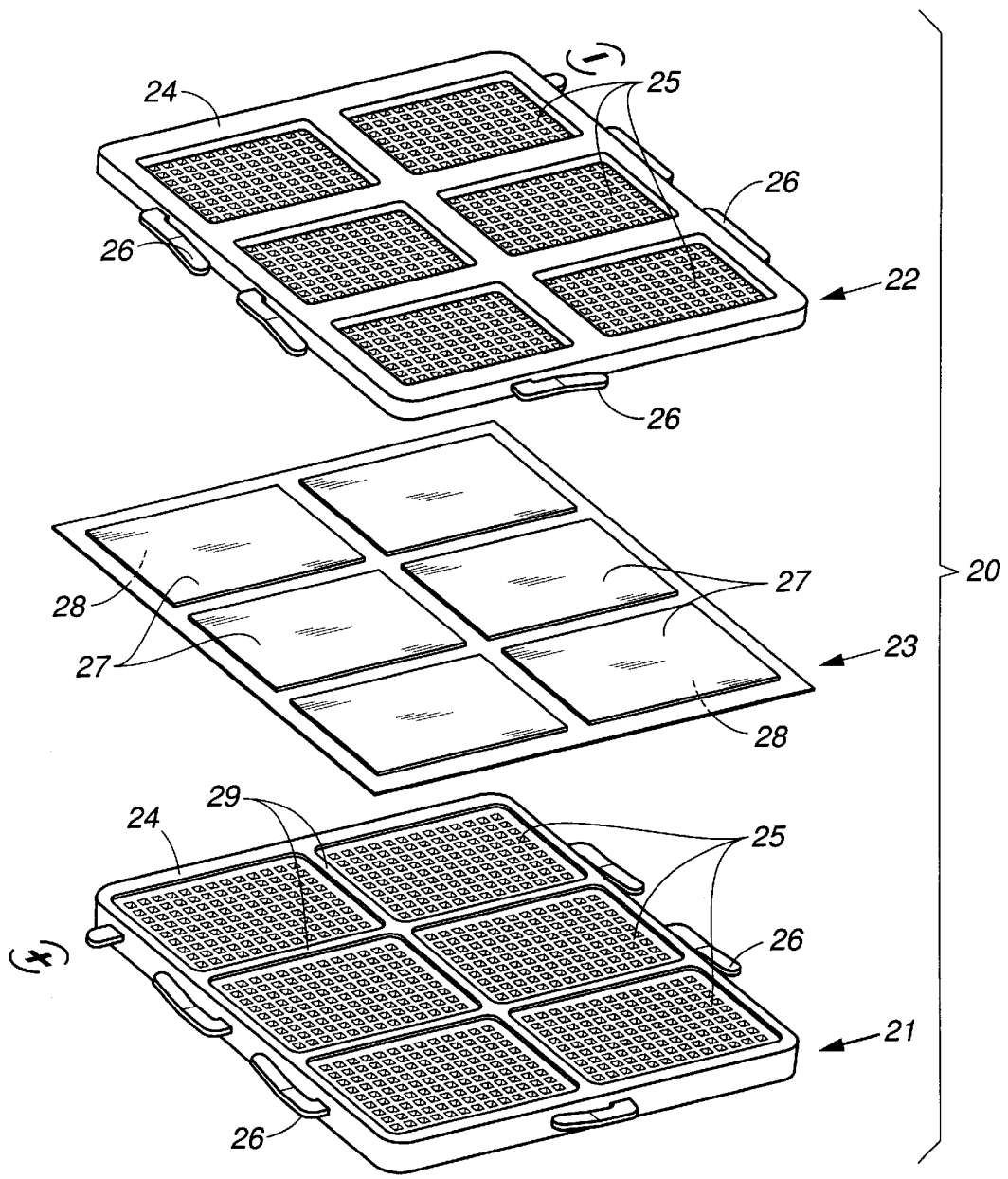
FIG. 2 is an exploded isometric view of a planar fuel cell in accordance with a preferred embodiment of the invention.

Referring now to FIG. 2, the planar fuel cell 20 contains two current collector assemblies 21, 22 that are sandwiched about an MEA 23. In one embodiment, each of the current collector assemblies 21, 22 consists of an electrically insulating plastic frame 24 that contains a plurality of current collectors 25 embedded within the plastic frame. Each of the current collectors 25 has an interconnect means 26 appended thereto. The interconnect means 26 serves to make an electrical connection to the exterior of the fuel cell, and is electrically connected to the current collector 25. Although the drawing depicts the interconnect means 26 as a tab, it can assume a variety of configurations, for example, a wire, as will be readily discernible to one of ordinary skill in the art. The current collectors 25 can be insert molded into the plastic frame 24 with the interconnect means 26 extending through the frame such that when the planar fuel cell is assembled, the current collector is within the perimeter of the MEA and the interconnect means is outside the perimeter of the MEA. One main advantage of this format is that the plastic frame 24 forms a gas tight integral seal around the interconnect means 26, thus eliminating the need to add other seals and/or gaskets.

The single MEA 23 in our planar fuel cell contains one or more (typically, in the preferred embodiment, a plurality) of anodes 27 disposed only on one side of the electrolyte sheet, and one or more (typically, in the preferred embodiment, a plurality) of cathodes 28 disposed only on the opposite side of the electrolyte sheet or PEM. Construction details of the anodes and cathodes have been briefly discussed above, and will not be further elucidated upon because they are well known in the fuel cell art, except to say that the anodes and cathodes may contain or perform additional functions such as water management and gas diffusion. When a plurality of anodes and cathodes are used, they are typically disposed on the solid electrolyte sheet in an array format, with each of the electrodes arranged such that they are associated with corresponding current collectors in each of the current collector assemblies. Our invention maximizes the active area of the electrolyte, because unlike prior art stacked fuel cells, where significant area around the perimeter of every MEA is dedicated to sealing and mounting, and unlike prior art planar fuel cells, where significant area is consumed by the need to seal the electrical connections as they penetrate the PEM, only the perimeter of the MEA is needed to effect the seal, and no electrical connections are made through the MEA. The latter feature is worth reiterating, that is, our novel scheme provides for electrical connections between and within the fuel cell without traversing the thickness of the solid electrolyte sheet. No penetrations are made in the MEA, thus the solid electrolyte can be made in a single, continuous sheet, with all the anodes on one side and all the cathodes on the other side. There are no holes or apertures to seal, as in the prior art. This novel scheme allows the individual anodes and cathodes in each of the arrays to be placed very close together, thus utilizing a greater amount of the active area, as high as 95% of the total area of the current collector assembly. The individual anodes or cathodes can be spaced as close as 1 mm to each other.

A unit cell is formed by the combination of a PEM, an anode, a cathode, and two associated current collectors. There are six unit cells in the exploded view of FIG. 2, and each of the unit cells is isolated from its neighbors by a wall 29 in the frame 24. Thus, the depicted planar fuel cell is the electrical equivalent of a six-high conventional fuel cell stack, while eliminating many of the seals, gas piping, and electrical interconnections.

Figure 3:
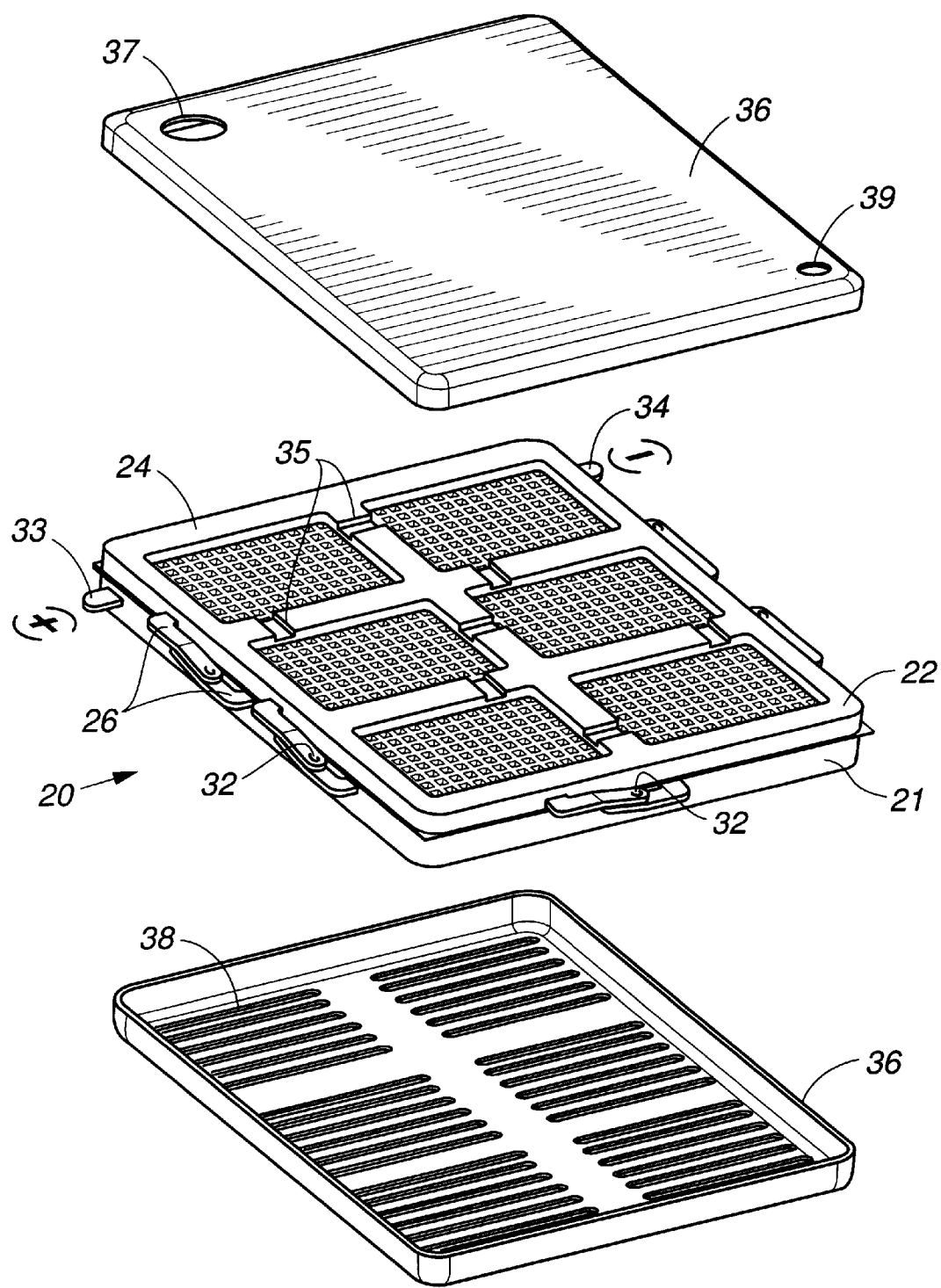
FIG. 3 is a further isometric view of the planar fuel cell of FIG. 2.

Referring now to FIG. 3, when the fuel cell 20 is laminated together, the interconnect means 26 in each of the current collector assemblies 21, 22 are connected to each other outside the periphery of the MEA to provide a path for electron transfer between anodes and cathodes. These connections 32, while shown as a series circuit, can also be arranged in parallel, or in a combination of series/parallel, depending on the output desired from the fuel cell. Two terminal interconnect tabs 33, 34 then form the positive and negative connections of the assembled fuel cell. This arrangement provides the significant advantage that the electrical interconnections are not on the interior of the fuel cell (i.e. not in the MEA) and do not traverse the thickness of the electrolyte, thus preserving the integrity of the electrolyte and allowing for a greater volumetric efficiency. Further, by utilizing a dielectric frame, the interconnection between the various anodes and cathodes can be easily sealed by embedding them in the frame, thus eliminating the need for messy gaskets.

A series of channels or distribution means 35 formed in the current collector assembly frame 24 allows the fuel gas to be distributed to the unit cells on only one current collector assembly. Likewise, the oxidant gas is distributed to the unit cells on the other current collector assembly (not shown). A cover 36 overlies each exterior side of the laminated fuel cell 20 to form a chamber over each of the current collector assemblies. Gas inlet means 37, 38 in each of the covers 36 provides porting for the fuel and oxidant gases. A port 37 on the anode side is where hydrogen is admitted, and louvers 38 on the cathode side allow ambient air into the fuel cell. An optional vent 39 provides for venting of unreacted fuel gas. Although the drawing depicts the cover as a bath tub configuration, a chamber can also be formed by simply placing a flat sheet over the plastic frame and sealing it appropriately, or the frame can be designed to incorporate an integral chamber.

Figure 4:
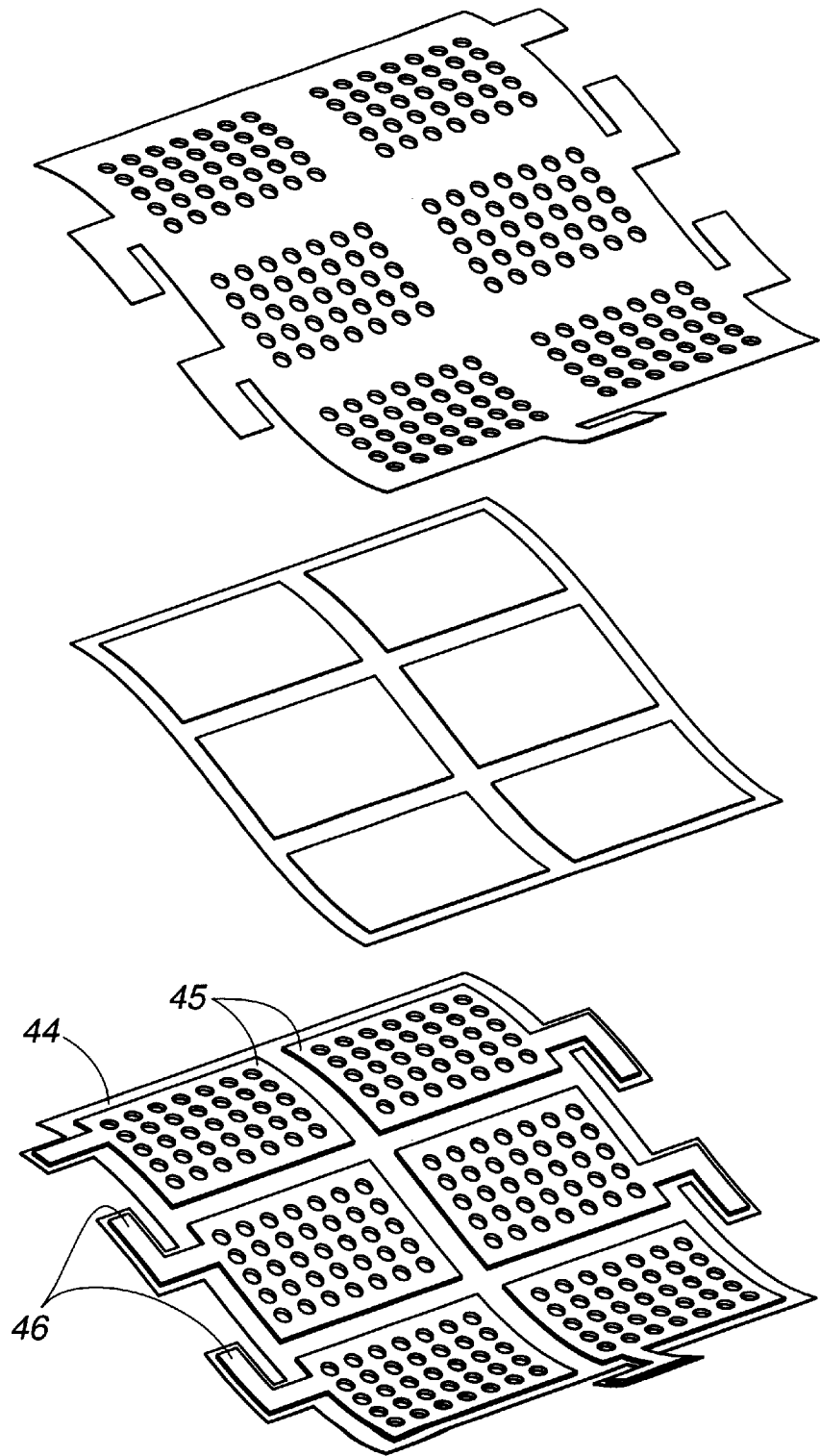
FIG. 4 is an exploded isometric view of an alternate embodiment of a fuel cell.

Having described one embodiment of our invention, other variants will now be explored. Obviously, the laminated structure comprising the MEA disposed between the two current collector assemblies must be held together. This can be accomplished by ultrasonically welding or by use of adhesives at the interfaces. FIG. 4 depicts an embodiment wherein the current collector assembly is fabricated in a very thin and flexible format by replacing the plastic frame with a plastic film 44 that has metal current collectors 45, for example, using a structure very much like a flexible circuit. Flexible circuits are well known in the printed circuit board industry, and the techniques of fabrication are readily available. In this case, the plastic film contains holes to provide passage of fuel and oxidant to the electrode. The current collectors are etched in the metal foil just like circuitry is etched to make a printed circuit. In addition, the metal current collectors can be formed by vacuum deposition. Electrical interconnections 46 are also made by connecting the outlying interconnect means to each other without traversing the MEA. This structure is even thinner than other embodiments, and the flexibility allows it to be formed into curvilinear shapes.

Figure 5:
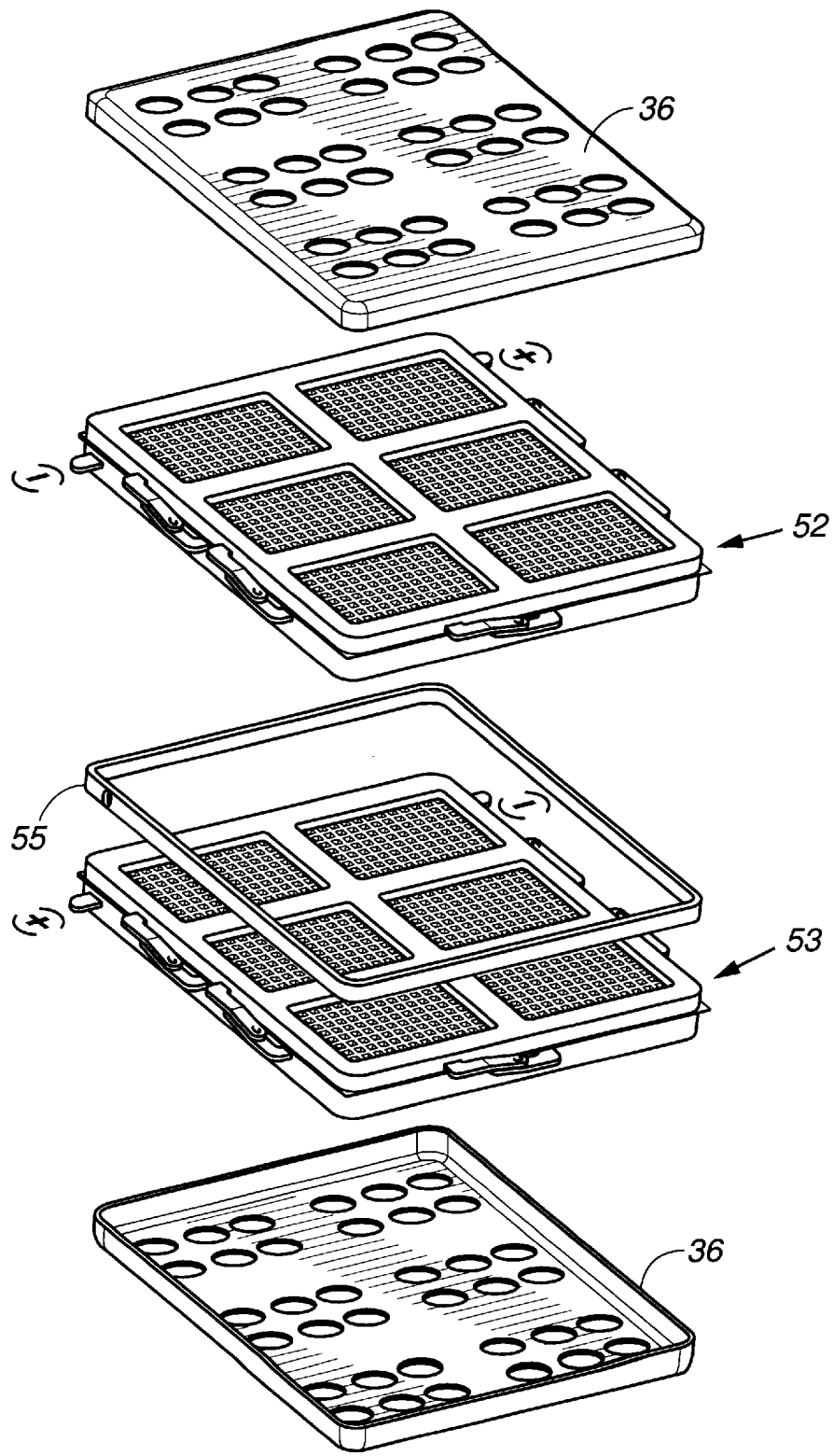
FIG. 5 is an exploded isometric view of another embodiment of a planar fuel cell.

In addition, our planar fuel cell can be essentially doubled by adding another cell. In FIG. 5 there are two laminated structures 52, 53 each containing an MEA sandwiched between two current collector assemblies. A fuel chamber 55 is common to each of the structures 52, 53 and the two covers 36 provide ambient air to the respective sides of the two structures. This structure retains the flat advantage and still provides a planar fuel cell, but it now has doubled the capacity.

Thus, we have created a very thin fuel cell that does not require complicated gaskets, screens, spacers, or gas porting as in the prior art, simplifying the design and reducing the cost. This unique cell does not have a bipolar plate, and thus eliminates the need for this expensive and fragile component. It provides a high capacity, low mass fuel cell with higher power density than prior art cells. While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. A planar fuel cell system, comprising:
   a membrane electrode assembly, comprising one solid electrolyte sheet having a plurality of anodes disposed on only one major side and a plurality of corresponding cathodes disposed on only an opposing major side;
   a plurality of current collectors each having an interconnect means and a plurality of apertures for passing reactant gases therethrough;
   each of the plurality of anodes and each of the plurality of cathodes having one of said plurality of current collectors associated therewith, the interconnect means arranged to provide electron transfer between anodes and cathodes such that the interconnect means does not traverse the thickness of the solid electrolyte; and
   distribution means for distributing a fuel to only one side of the membrane electrode assembly and oxidant only to the other side of the membrane electrode assembly such that the fuel and the oxidant pass through the apertures perpendicular to the respective current collectors.

2. The fuel cell as described in claim 1, wherein the electron transfer between anodes and cathodes forms a series circuit.

3. The fuel cell as described in claim 1, wherein the plurality of anodes or the plurality of cathodes further comprises a gas diffusion layer.

4. The fuel cell as described in claim 1, wherein the plurality of anodes or the plurality of cathodes further comprises a water management layer.

5. A fuel cell system, comprising:
   first and second current collector assemblies, each comprising a plurality of current collectors integral to an insulating frame, each of said current collectors having a plurality of apertures for passing reactant gases therethrough and each having an interconnect means;
   a single membrane electrode assembly, comprising a solid electrolyte having a plurality of anodes disposed only on one major side and a plurality of corresponding cathodes disposed only on an opposing major side; and
   the membrane electrode assembly disposed between the first and second current collector assemblies such that the interconnect means does not traverse the thickness of the solid electrolyte and such that the reactant gases pass through the apertures in a direction normal to a major surface of the current collectors.

6. The fuel cell as described in claim 5, further comprising a gas tight seal formed about the membrane electrode assembly and about the interconnect means.

7. The fuel cell as described in claim 5, wherein said one or more anodes and said cathodes are each arranged in an array.

8. The fuel cell as described in claim 7, wherein spacing between each of the anodes and each of the cathodes in the array is less than 2 mm.

9. The fuel cell as described in claim 5, wherein the total surface area of the anodes and cathodes is greater than 95 percent of the total surface area of the membrane electrode assembly.

10. The fuel cell as described in claim 5, wherein the fuel cell does not contain a bipolar plate.

11. The fuel cell as described in claim 5, wherein the solid electrolyte is a single, continuous film.

12. The fuel cell as described in claim 5, wherein the solid electrolyte is a polymer electrolyte membrane.

13. The fuel cell as described in claim 5, wherein a fuel gas is ported to the first current collector assembly, and wherein all current collectors on the first current collector assembly share a common chamber.

14. The fuel cell as described in claim 5, wherein all current collectors in the second current collector assembly are exposed to ambient air.

15. The fuel cell as described in claim 5, wherein the first and second current collector assemblies are planar.

16. The fuel cell as described in claim 5, wherein the interconnect means is insert molded into the insulating frame to form the gas tight seal.

17. The fuel cell as described in claim 5, wherein the interconnect means comprises a tab.

18. The fuel cell as described in claim 5, further comprising:
   third and fourth current collector assemblies, each comprising one or more current collectors integral to an insulating frame, each of said one or more current collectors having an interconnect means;

a membrane electrode assembly, comprising a solid electrolyte having one or more anodes disposed only on one major side and one or more corresponding cathodes disposed only on an opposing major side;

the membrane electrode assembly disposed between the third and fourth current collector assemblies such that the interconnect means does not traverse the thickness of the solid electrolyte and a gas tight seal is formed about the membrane electrode assembly and about the interconnect means; and wherein said first and third current collector assemblies are attached to each other such that they share a common fuel gas chamber and one side of each of said second and fourth current collector assemblies is exposed to ambient air.

19. A planar fuel cell system, comprising:

first and second planar current collector assemblies, each comprising an array of current collectors insert molded into a thermoplastic frame, each of the current collectors in the array having a plurality of apertures for passing reactant gases and having an interconnect tab embedded into the thermoplastic frame to provide a gas tight seal;

a membrane electrode assembly, comprising a single sheet of a polymer electrolyte membrane having an array of anodes disposed on a first major side and an array of corresponding cathodes disposed on a second opposing major side, all anodes being on the first major side of the sheet and all cathodes being on the second major side;

the membrane electrode assembly disposed between the first and second planar current collector assemblies such that said array of anodes is adjacent to the array of current collectors in the first current collector assembly and said array of cathodes is adjacent to the array of current collectors in the second current collector assembly;

the first and second planar current collector assemblies bonded to each other at their perimeters such that a gas tight seal is formed about the membrane electrode assembly;

the interconnect tabs from the first and second planar current collector assemblies arranged to provide an electron transfer path from an anode to a neighboring cathode such that the electron transfer path does not traverse the thickness of the polymer electrolyte membrane; and whereby a fuel gas is distributed to each of the plurality of anodes through the apertures in the anode current collectors and whereby an oxidant gas is distributed to each of the plurality of cathodes through the apertures in the cathode current collectors.

20. The planar fuel cell as described in claim 19, wherein the first and second planar current collector assemblies are bonded to each other by ultrasonic weld.

21. A planar fuel cell, comprising:

first and second current collector assemblies, each comprising a plastic film having an array of current collectors laminated thereon, each of said current collectors having an interconnect means and a plurality of apertures therein;

a membrane electrode assembly, comprising a film of a polymer electrolyte membrane having an array of anodes disposed only on only one major side and an array of cathodes disposed only on an opposing major side;

the membrane electrode assembly laminated between the first and second current collector assemblies such that each of the anodes and each of the cathodes have a current collector associated therewith, the interconnect means arranged to provide electron transfer from an anode to a neighboring cathode such that the interconnect means does not traverse the thickness of the polymer electrolyte membrane and a gas tight seal is formed about the membrane electrode assembly and about the interconnect means; and whereby a fuel gas is distributed to each of the plurality of anodes through the apertures in the anode current collectors and whereby an oxidant gas is distributed to each of the plurality of cathodes through the apertures in the cathode current collectors.

22. The planar fuel cell as described in claim 21, wherein the planar fuel cell is flexible and can be formed into curvilinear shapes.

23. A planar fuel cell, comprising:

a membrane electrode assembly, comprising one solid electrolyte sheet having a plurality of anodes disposed on only one major side and a plurality of corresponding cathodes disposed on only an opposing major side;

a plurality of current collectors each having an interconnect means and a plurality of apertures therein;

each of the plurality of anodes and each of the plurality of cathodes having one of said plurality of current collectors associated therewith, the interconnect means arranged to provide electron transfer between anodes and cathodes such that the interconnect means does not traverse the thickness of the solid electrolyte; and whereby a fuel gas is distributed to each of the plurality of anodes through the apertures in the anode current collectors and whereby an oxidant gas is distributed to each of the plurality of cathodes through the apertures in the cathode current collectors.

* * * * *